L. H. FERGUSON.
VEHICLE TIRE.
APPLICATION FILED MAY 3, 1918.

1,306,587.

Patented June 10, 1919.

INVENTOR
Lyman H. Ferguson
BY
J. W. Ellis
ATTORNEY

UNITED STATES PATENT OFFICE.

LYMAN H. FERGUSON, OF ITHACA, NEW YORK, ASSIGNOR TO FERGUSON TIRE CORPORATION, A CORPORATION OF NEW YORK.

VEHICLE-TIRE.

1,306,587.

Specification of Letters Patent. Patented June 10, 1919.

Application filed May 3, 1918. Serial No. 232,203.

*To all whom it may concern:*

Be it known that I, LYMAN H. FERGUSON, a citizen of the United States of America, and a resident of the city of Ithaca, in the county of Tompkins and State of New York, have invented certain new and useful Improvements in Vehicle-Tires, of which the following is a full, clear, and exact description.
My invention relates in general to a vehicle tire and more particularly to a combination cushion and pneumatic tire.

The object of this invention is to provide a tire which may be used with or without air under pressure. My tire is normally inflated with air, under pressure, and still may be efficiently used without air, even though punctured.

Moreover, my tire is so constructed that the liability to puncture is substantially 50% less than the well known pneumatic tire; and, if the tire is punctured, it is not necessary to immediately repair it or inflate it, since it may be used in this condition for some time without injury. This makes it unnecessary to carry extra tires and rims.

Furthermore, my tire does away with the use of inner tubes, as it is normally pneumatic; and, as but only low air pressure is required, blow-outs are practically impossible.

Reference is to be had to the accompanying drawings forming part of this application, in which like characters of reference indicate like parts throughout the several views, of which:

Figure 1:
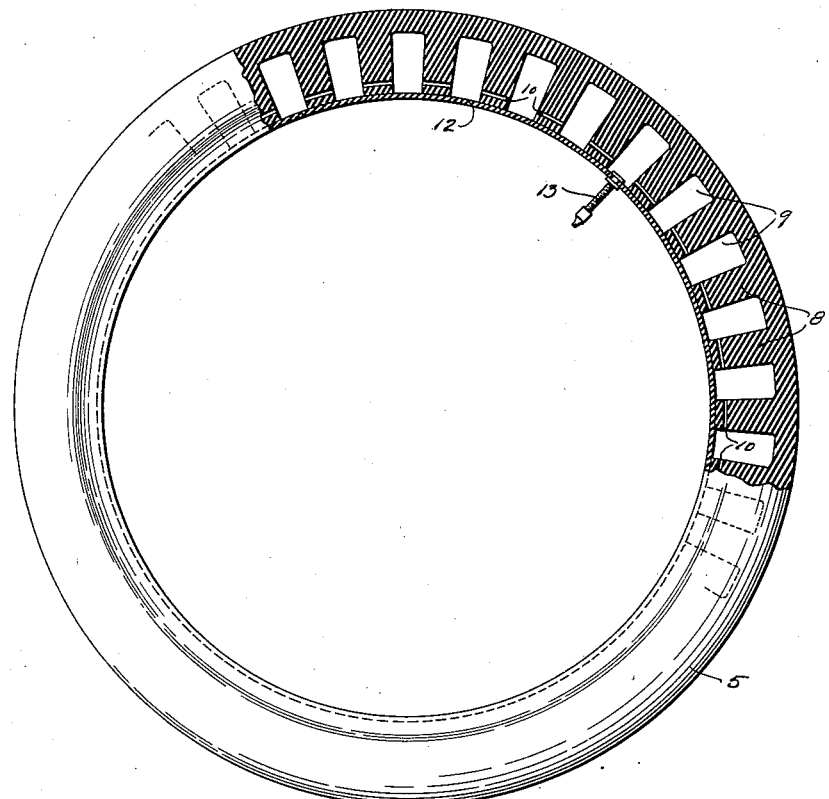
Figure 1 is a side elevation of my improved tire, partly in section.
Figure 2:
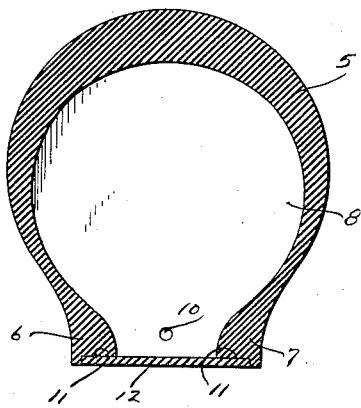
Fig. 2 is a transverse, sectional elevation thereof.

In the drawings, 5 is the tire casing of the straight side type, having flanges 6 and 7. 8 are integral radial resilient approximately circular partitions, each of which is approximately equal in thickness to the width of the space 9 formed between any two of them and an inner tongue part. Each of the partitions is provided near its inner side, between the flanges 6 and 7 in the tongue part of the partition, with a small aperture forming a port 10, adjacent to an inner annular sealing strip which permits air under pressure to pass into each of the spaces 9.

The tire is molded with a sectional mold, so that the partition may be made integral with the casing at all points of contact therewith, thus avoiding the possibility of friction between the partitions and the interior of the casing, and also the necessity of subsequent vulcanizing of the partitions to the side walls of the casing.

The flanges 6 and 7 of the casing are each provided with an annular recess 11, into which an annular rubber sealing strip 12 is placed and vulcanized, thus closing all of the spaces 9 between the partitions 8 in the tire independent of the rim (not shown) on which the tire is mounted so as to provide a closed and sealed structure. An air valve 13 is secured to the sealing strip, through which air may be forced into a space 9 of the tire and then through the small apertures forming the ports 10 in the partitions into the other spaces of the tire.

Should the tire become punctured, the partitions 8 will support the load until the tire is repaired. The partitions cover substantially one-half of the inner circumference of the tire, so that the chances of puncture are greatly minimized.

Having thus described my invention, what I claim is:

A vehicle tire constructed with flanges spaced apart, each flange having an annular rabbet or recess, integral radial resilient partitions leaving spaces between them of approximately the width of the partitions; each partition having an approximately circular imperforate part and a tongue part having an aperture providing a small port extending between each two spaces adjacent to the inner edge of the tire, and an annular sealing strip having its edges fitted in the annular rabbets or recesses and bridging and closing the inner ends of the spaces between the partitions independent of the rim on which the tire is mounted so as to provide a closed and sealed structure.

In testimony whereof, I have hereunto signed my name.

LYMAN H. FERGUSON.